United States Patent [19]
Wang et al.

[11] Patent Number: 5,056,106
[45] Date of Patent: Oct. 8, 1991

[54] GOLF COURSE RANGING AND DIRECTION-FINDING SYSTEM USING SPREAD-SPECTRUM RADIOLOCATION TECHNIQUES

[76] Inventors: James J. Wang, 2625 Monterey Rd., San Marino, Calif. 91108; Robert M. Grayson, 3082 Inverness Dr., Los Alamitos, Calif. 90720

[21] Appl. No.: 561,579

[22] Filed: Aug. 2, 1990

[51] Int. Cl.$^5$ .......................... G01S 5/12; A63B 57/00
[52] U.S. Cl. .......................................... 375/1; 342/450; 342/451; 342/458; 342/463; 273/32 B; 273/32 H; 273/213; 370/18; 364/561; 364/460
[58] Field of Search ................. 375/1; 342/36, 37, 42, 342/450, 451, 457, 458, 463; 273/32 B, 32 H, 213; 364/561, 460; 370/18, 93

[56] References Cited

U.S. PATENT DOCUMENTS

| 3,150,372 | 9/1964 | Groth, Jr. | 342/458 |
|---|---|---|---|
| 3,868,692 | 2/1975 | Woodard et al. | 342/458 |
| 4,136,394 | 1/1979 | Jones et al. | 364/561 |
| 4,297,701 | 10/1981 | Henriques | 342/42 |
| 4,480,310 | 10/1984 | Alvarez | 364/450 |
| 4,665,404 | 5/1987 | Christy et al. | 342/463 |
| 4,698,781 | 10/1987 | Cockerell, Jr. | 364/561 |
| 4,703,444 | 10/1987 | Storms, Jr. et al. | 364/561 |
| 4,731,613 | 3/1988 | Endo et al. | 342/451 X |

Primary Examiner—Stephen C. Buczinski
Assistant Examiner—Bernarr Earl Gregory
Attorney, Agent, or Firm—Hoffman, Wasson & Gitler

[57] ABSTRACT

The invention disclosed herein is directed to a method and apparatus which employs a spread-spectrum based radiolocation system, using hand-held receiver units and fixed-position reference transmitters, to determine distance and direction between a golfer and key locations on a golf course, such as the distance and direction to a particular pin. The plurality of timing reference transmitters which are located throughout the vicinity of the golf course broadcast a spread-spectrum ranging signal consisting of a radio-frequency carrier directly modulated by a periodic pseudo-noise (PN) coded or similar sequence. Each transmitter broadcasts at the same RF signal but a unique PN-coded sequence is assigned to each transmitter. Golfers are provided with the hand-held receiving unit which receives the transmitter spread-spectrum signals and which synchronizes to the spread-spectrum signals in order to obtain range estimates to a selected set of reference transmitters. The hand-held receivers also include memory to store the coordinates of the reference transmitters and the pin positions and other reference points for each hole on the golf course, which are either pre-loaded into memory or transmitted (as modulating data) with the ranging signal. Each hand-held unit also includes a digital processor which incorporates a hyperbolic location algorithm to compute the hand-held unit position based on the estimated ranges to the selected transmitters and the reference transmitter coordinates. The distance and direction from the current position to the pin or other selected reference points is then displayed via an appropriate medium on the hand-held unit.

11 Claims, 6 Drawing Sheets

GOLF COURSE RANGING AND DIRECTION-FINDING SYSTEM USING SPREAD-SPECTRUM RADIOLOCATION TECHNIQUES

FIELD OF THE INVENTION

The invention relates generally to an improved technique for allowing golfers to determine their distance and direction to key points on a golf course. More specifically, the present invention improves substantially on previous systems for golf course distance determination through the use of spread-spectrum signaling and hyperbolic location technology.

BACKGROUND OF THE INVENTION

Golfers are frequently interested in knowing their distance and direction to the pin from the tee or fairway locations. Skilled golfers, and in particular professionals, can control their shots to within a few yards of a desired target. Thus it is of considerable advantage to this class of golfers to be able to estimate their distance to the pin or other locations with very high accuracy from any feasible position of play. This is also true for the average or weekend golfer who does not have the experience to estimate the distance to a particular hole with any degree of accuracy.

Previous systems have relied on optical sighting systems, dead-reckoning systems, and RF-based systems. In a system to Woodward (U.S. Pat. No. 3,868,692), a transmitter placed at each pin broadcasts a continuous wave RF signal. A hand-held unit measures the field-strength of the signal emitted by each pin and uses an analog meter to indicate yardage to the pin. This system is straightforward and simple, and allows the plurality of hand-held units to operate on a non-interfering basis, but requires the golfer to visually estimate yardage from an analog meter on the hand-held unit. Accuracy can also be affected significantly by analog component tolerances and aging, as well as low levels of unexpected RF interference at the transmitter frequencies. In a system to Henriques and Angleman (U.S. Pat. No. 4,297,701), a hand-held transceiver unit transmits a coded signal to a flagstick mounted unit which is itself a transceiver. The flagstick unit is identified by the code, and the identified flagstick unit retransmits the received signal back to the hand-held unit. Distance estimation is based on measuring the two-way signal delay between the hand-held and flagstick units, which is implemented in the hand-held unit by charging and discharging of a capacitor. These systems also suffer from the necessity of mounting the transmitter or transceiver unit on or near the flagstick, where it may be easily damaged and is undesirable aesthetically, or may not be permitted.

Other patents for distance determination, such as Cockerell (U.S. Pat. No. 4,698,781) and Storms et al (U.S. Pat. No. 4,703,444) describe a system in which hand-held transceivers operate in conjunction with a triangular arrangement of fixed-position transceivers which eliminate the need for flag-pole mounted units. Each hand-held interrogation unit stores the coordinates of key course features and the fixed-position transceivers and can provide the golfer with an estimate of his distance to any of these features on a particular hole. In the system to Storms et al, three remote transmitters arranged approximately in a triangle about a golf course transmit repetitive pulse sequences which are received and processed by the hand-held interrogation unit. The hand-held unit uses a counter to estimate the difference in arrival time between the pulse transmitted by the first and second transmitters, and then the arrival time difference between the pulses from the second and third transmitters. Based on these two time-difference estimates, the hand-held unit computes its current location and then computes and displays the distance to the desired course feature.

SUMMARY OF THE PRESENT INVENTION

The present invention describes a system which adapts the principles of spread-spectrum signaling and hyperbolic location algorithms to golf course range and direction determination. Specifically, the present invention allows a plurality of golfers to determine their distance and direction to any selected golf course points with greater accuracy and reliability than previously achieved, without interference from each other, using a portable hand-held spread-spectrum receiver/processor unit of low complexity and low cost.

The present system employs hand-held or mountable (on golf carts, for instance) lightweight electronic receivers, in conjunction with a set of fixed position RF transmitters, strategically placed at various points within the boundaries and/or near the perimeter of a golf course. The present invention uses spread-spectrum signaling and code-division multiple access (CDMA) to allow a plurality of reference transmitters on a single course to operate on a non-interfering basis. The use of spread-spectrum signaling and the ability to utilize a larger number of reference transmitters can be seen to provide the capability for much higher accuracy than prior art systems.

In one embodiment, code-division multiple-access is implemented by directly modulating each reference transmitter's radiated carrier signal with a unique pseudo-noise sequence chosen from a set of such sequences providing low mutual interference. Other embodiments, however, are possible, such as frequency separation of the transmitter channels to reduce interference among transmitter signals.

Each of the reference transmitters continually broadcast an RF carrier, with each transmitter's carrier digitally modulated by the length N binary pseudo noise (PN) code or related sequence which is unique to the transmitter. At least four such transmitters are required for a single golf course in order for the receiver units to determine their current three-dimensional position coordinate on the golf course. However, more than four transmitters may be operational on a golf course with no changes required to the design of the transmitters or hand-held units. The use of more than four transmitters is preferred when the topology of a particular golf course precludes accurate operation over all areas of play with only four reference transmitters.

Each hand-held receiver consists of an analog unit for receiving, filtering, amplifying, and frequency-translating to a suitable IF frequency if required, the RF signal radiated by any of the fixed position transmitters. The hand-held receiver also includes the capability of synchronizing an internally generated replica of a transmitter's particular PN code sequence to the received PN code sequence from the transmitter. The handheld unit synchronizes to the PN codes of a predetermined set of four transmitters for each distance request which is initiated by the golfer using the hand-held unit. Three-dimensional location coordinates of the reference transmitters and the coordinates of the holes and other locations of interest on the golf course are either pre-stored in the memory of each unit or modulated as data onto the ranging signals and recovered by the receiver of each unit. In the pre-stored approach, memory containing these coordinates is customized for a particular golf course, and can be updated for changes in pin location or transmitter location.

The distance and directional request to a particular location is initiated from a control panel on the receiver unit. The particular hole number and the object of interest are first selected, and the code acquisition sequence in the hand-held receiver, based upon a distance request, is then initiated and the receiver attempts to synchronize to the transmitted signal of four transmitters. The four transmitters are identified in the hand-held unit by their unique PN code. After successful timing acquisition, the time differences between the epochs of each of four transmitter's PN codes and the receiver's local PN code are measured. The coordinates of the same four transmitters, which are either pre-stored in memory or are transmitted through ranging signals and recovered by the receiver, are used to determine the position of the current location using a hyperbolic location algorithm. The hyperbolic location algorithm is implemented entirely in a digital processor in the hand-held unit. After computing the current location, the processor then computes the distance and direction to the location of the selected point of interest on the golf course, and displays this distance and direction via suitable media on the front panel of the unit.

The present system thereby enables the hand-held units to operate autonomously without the use of any centralized control station for a golf course. Operation only requires that the hand-held unit memory contains the necessary location coordinates for a particular course. The present system also eliminates the need to place transceivers or other system elements on or near the pin or green or other object. Transmitters can be located at convenient and existing structures such as light posts or other elevated structures.

An advantage of the present invention over prior art systems is the use of direct-sequence spread spectrum waveform for the ranging signal, providing much higher accuracy than simple pulsed or phase comparison approaches previously used. The advantages of spread-spectrum signaling over simpler signal structures in the present system are well known to those knowledgeable in the spread-spectrum art.

Another advantage is the ability to use a plurality of transmitters, each assigned a unique PN code chosen from a code family providing low multiple access interference. This allows the hand-held receiver to select a different set of four transmitters for distance determination on different parts of a golf course, without interference from the other transmitters. Thus, the present system utilizes the advantages of spread spectrum CDMA to further increase location accuracy, wherein an increased number of transmitters can be placed about a golf course to overcome geographic limitations and line of sight blockage and multipath effects between transmitter and receivers at various locations on a golf course.

A further advantage of the present system is the use of hyperbolic location techniques using range estimates derived from four separate transmitters. Location estimates are thus based on the full three-dimensional position of the transmitter and receiver while eliminating the need for any synchronization of timing between a transmitter and receiver units. Describing the location of the transmitter units in three dimensions takes into account the heights of the transmitter units and receiver in determining distance and direction to particular objects on the course, thus allowing more accurate distance and direction readings.

Additional features and aspects of the present invention are described in the detailed description and preferred embodiments.

DETAILED DESCRIPTION OF THE INVENTION

Figure 1:
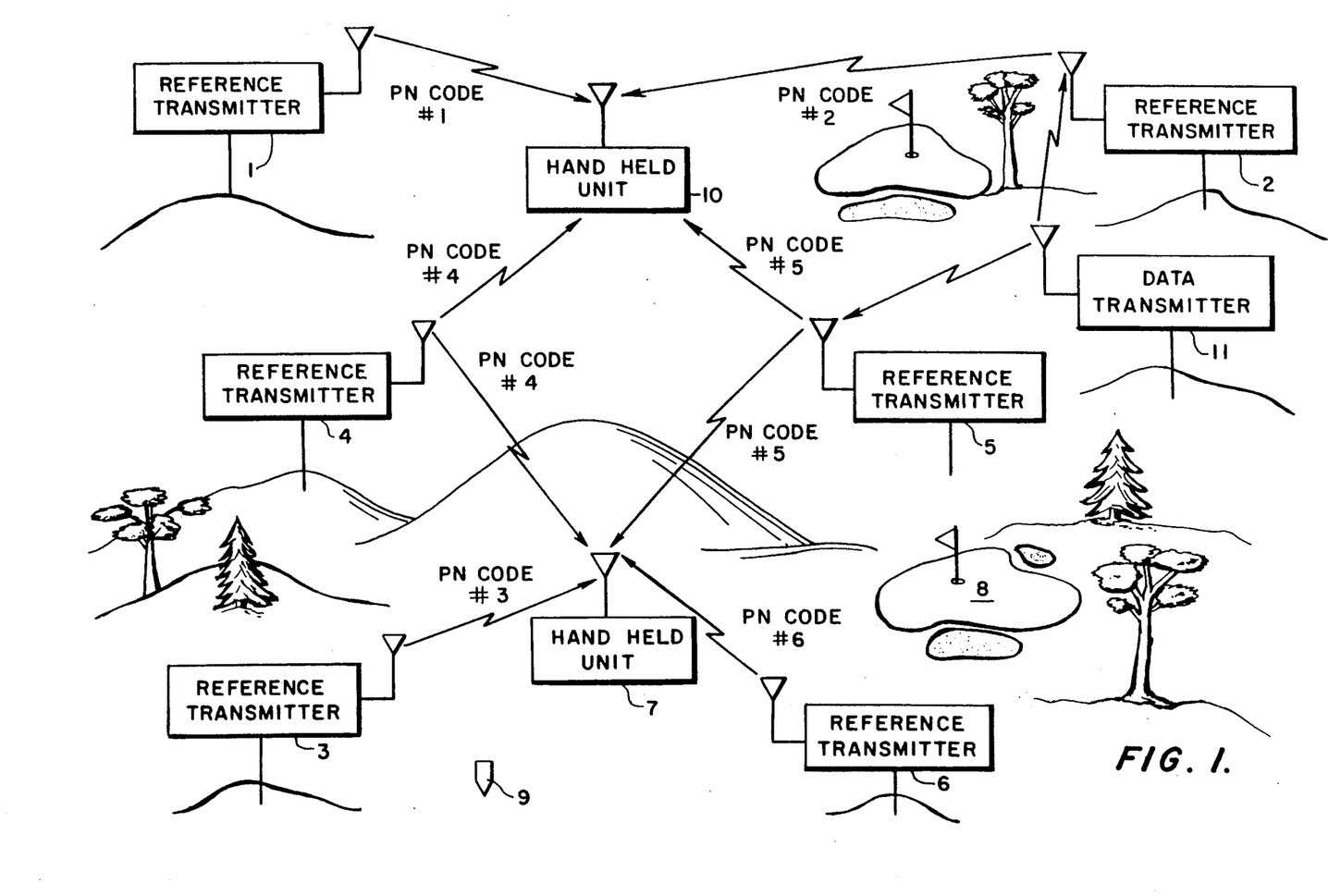
FIG. 1 is a diagram showing the key elements and a representative layout of the system.

FIG. 1 represents a perspective view of the ranging and direction-finding system showing a hypothetical arrangement of six reference transmitters 1, 2, 3, 4, 5 and 6, two hand-held receiver units 7 and 10, a flagstick 8, and a fairway reference coordinate point 9. Although six reference transmitters are shown for illustration, more or less transmitters may be employed to maintain the desired range and direction accuracy over all feasible locations on a given course. The entire set of transmitters for a particular course is located at various positions on the course such that, for each feasible range and direction measurement position, a receiver can choose four transmitters whose geometry relative to the receiver minimizes signal level differences, minimizes blockage and/or multipath effects, and minimizes effects such as geometric dilution of precision, all of which contribute to range and direction estimation inaccuracy. However, it is noted that once a particular hole is chosen, the same four transmitters would be utilized. In this instance, the coordinates of the four transmitters assigned to that particular hole will be retrieved from the memory of the receiver units. Furthermore, four n-bit words which unambiguously identify the length $2^n - 1$ PN sequences broadcast by each of the four assigned transmitters are also retrieved. Thus, the receiver will only acquire and track the signals from the four transmitters assigned to the particular hole selected by the receiver.

Each hand-held receiver 7, 10 is capable of receiving the signal emitted by any of the transmitters, with range measurements to four of the transmitters required for a distance measurement at any point on the course. As shown in FIG. 1, hand-held receiver 10 is shown using the pseudo-noise coded signals from transmitters 1, 2, 4 and 5 and hand-held receiver 7 is using the pseudo-noise coded signals from transmitters 3, 4, 5 and 6.

Figure 7:
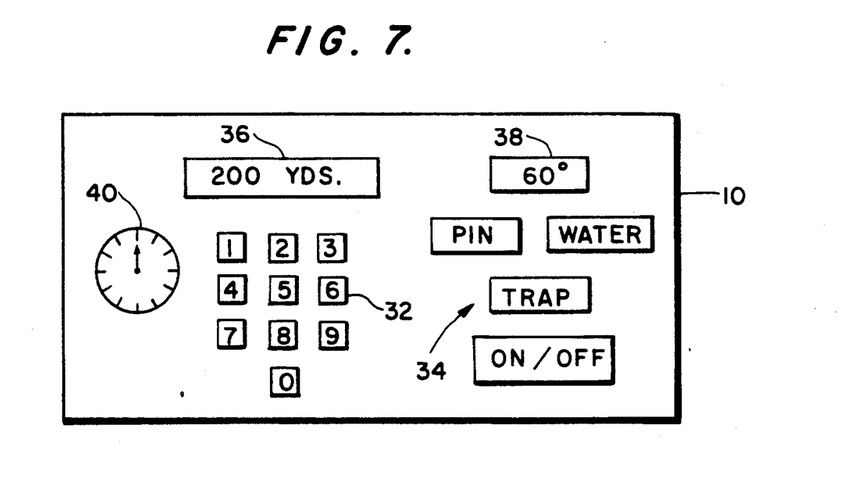
FIG. 7 illustrates the keyboard and display of the hand-held unit.

In practice, the hand-held receiver is provided with an input portion and a display portion. The input portion would include a keyboard 32 or other information input device for indicating the hole of interest as well as whether the golfer is concerned with the distance to the golfer hole, or other geographical locations, such as ponds, streams or sand traps. These additional locations are indicated at 34. Once the golfer inputs his distance request into the hand-held receiver, the receiver would process this request, and based upon the information received from the transmitters, the golfer's position is determined and the distance from this position to the particular target or geographic location is computed and displayed on the display portion, preferably in digital form. The distance is displayed on display unit 36 and the direction is displayed as an angle 38 with respect to a magnetic compass 40.

The reference transmitter signal is generated by using a pseudo-noise (PN) code of length $N=2^n-1$ bits or chips and chip rate $R_c$ chips/sec to directly modulate a radio frequency carrier. In the preferred embodiment, the modulation method used is binary phase-shift keying digital modulation. However, other modulation methods are possible, and the operation of the system is not limited to the use of binary phase shift keying. The PN code length is chosen such that for a chip rate of $R_c$ chips/sec, $$\frac{N}{R_c} \geq \frac{r_{max}}{c}$$

wherein c is the velocity of light and $r_{max}$ is the maximum distance between any position of a hand-held receiver on a golf course and any of the L transmitters.

In the preferred embodiment, each reference transmitter transmits on the same basic carrier frequency $f_c$. However, each transmitter's N-chip PN code is unique, L different PN codes being assigned to a single golf course, each associated with one of the L transmitters. In FIG. 1, the PN code assigned to each transmitter 1, 2, 3, 4, 5, 6 is identified by the transmitter number.

Each of the L (L=6 in FIG. 1) PN codes are chosen so as to minimize the cross-correlation levels between any pair of codes. The design of PN code sets with this property is well-known to those knowledgeable in the art of spread-spectrum multiple-access code design.

Figure 6:
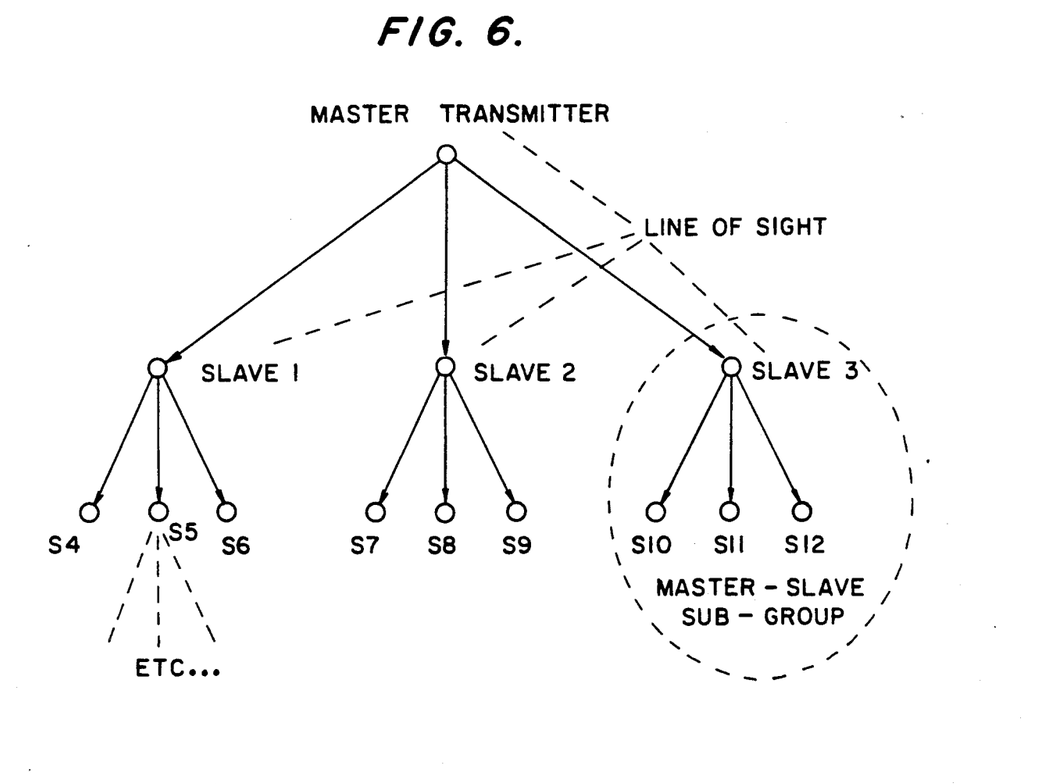
FIG. 6 illustrates the master-slave synchronization scheme for synchronizing the reference transmitters.

The reference transmitters are also provided with the means to synchronize the PN code epochs of all the L transmitted codes to a system epoch time reference $t_o$. In the preferred approach, a hierarchical master-slave synchronization scheme is used to synchronize the L transmitters. This simple synchronization scheme is illustrated in FIG. 6. One of the L timing transmitters is designated as the master synchronization transmitter. Its reference signal is, in addition to being received by the hand-held units, also received by a subset of the other reference transmitters, each of which includes a spread-spectrum receiver of similar design to the hand-held units including a PN code epoch recovery and delay compensation processor 22. Each of the reference transmitters in this subset synchronizes to the PN code epoch of the master transmitter, and each performs delay compensation based on the precisely known distance between themselves and the master transmitter. Each of these transmitters in turn can act as a master timing transmitter to other subsets of reference transmitters, until the whole network of reference transmitters for a particular course is synchronized. In this preferred synchronization scheme, the same frequencies and PN codes are used for timing synchronization of the transmitters as for distance estimation by the receivers.

Thus, the receivers employed in the reference transmitters for timing synchronization are of the same basic design as the hand-held receiving apparatus used on the golf course.

Figure 4:
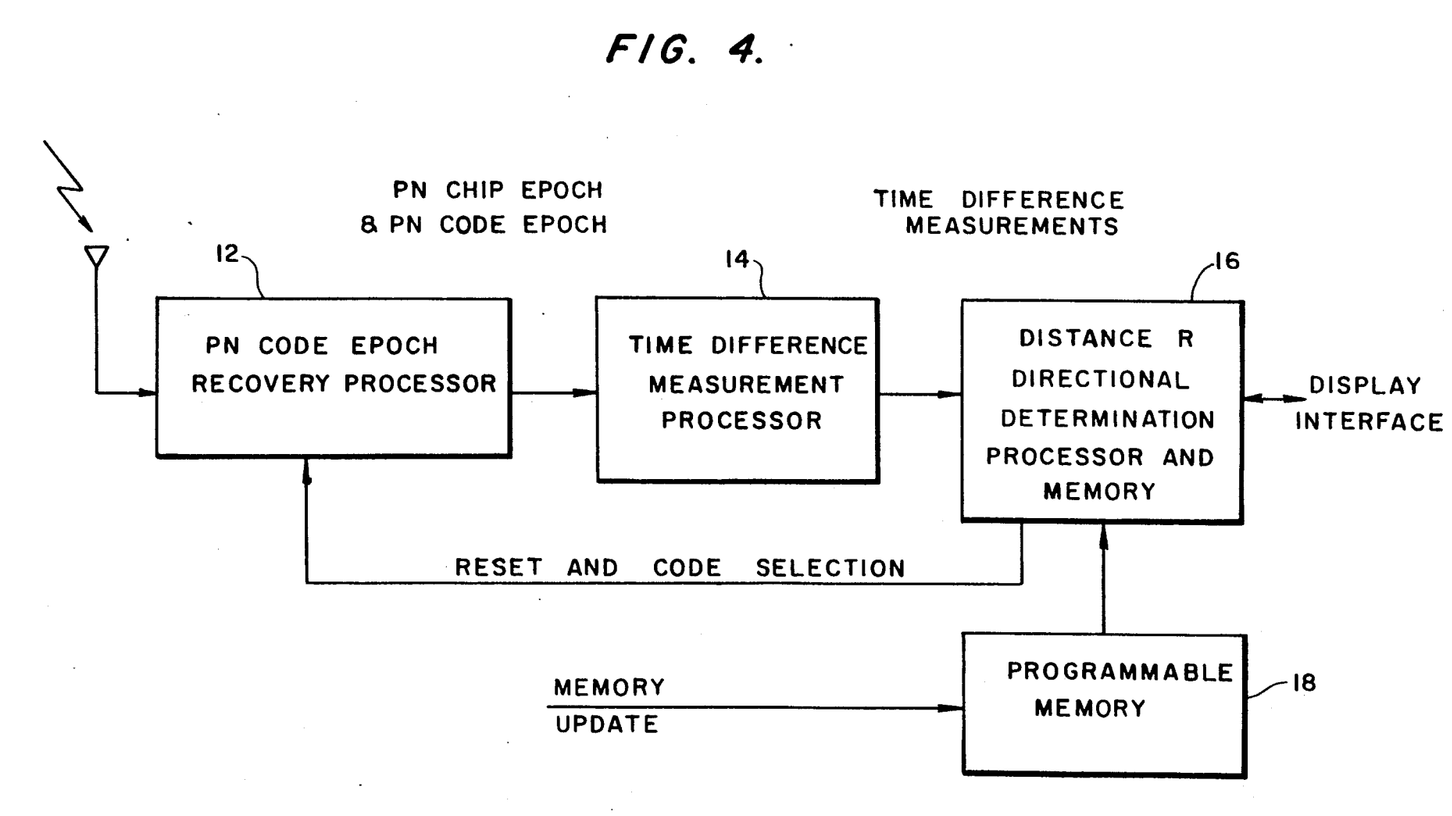
FIGS. 4 and 5 are block diagrams showing the major hand-held receiver elements for two embodiments of the system.
Figure 5:
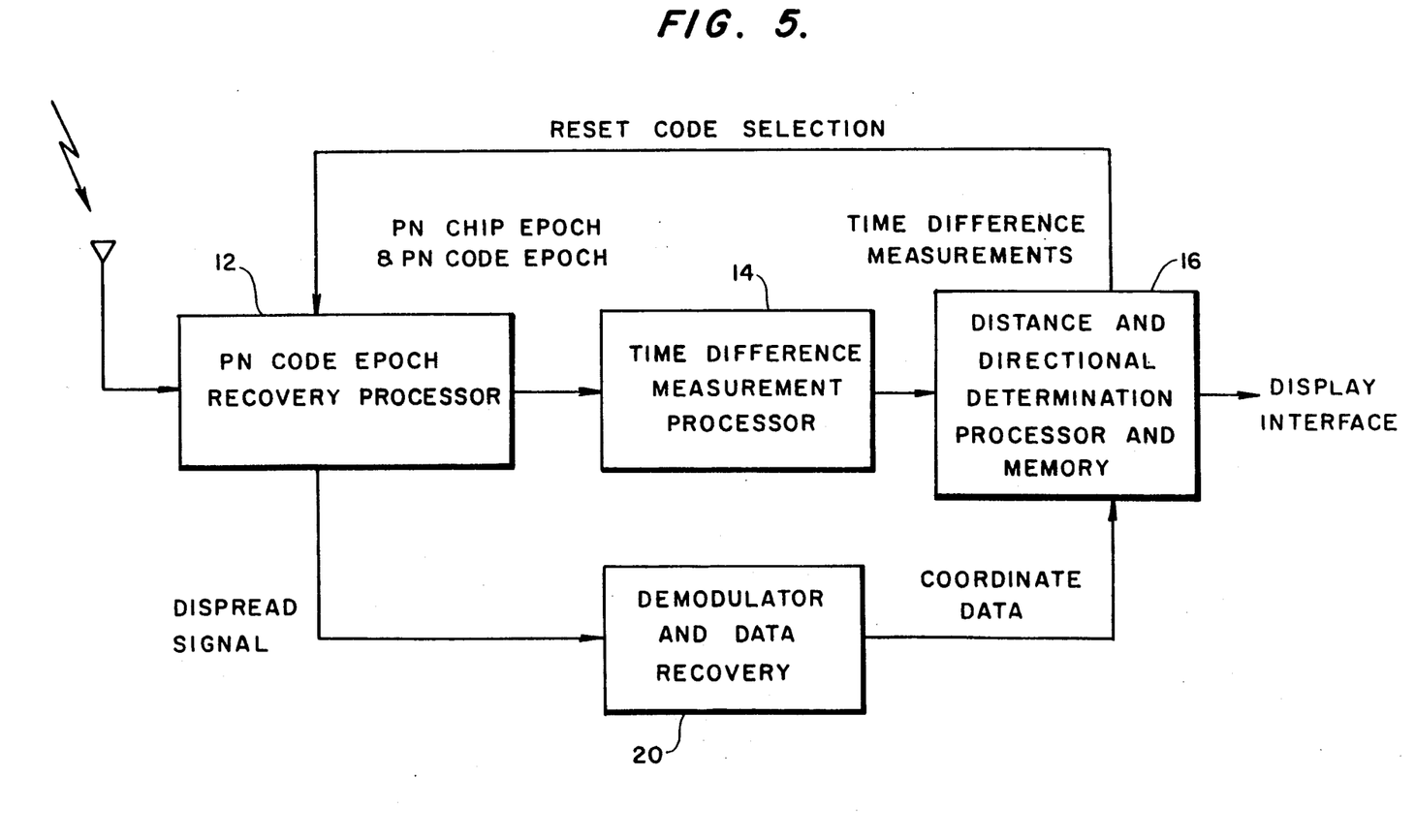

Each hand-held receiver, as depicted in FIG. 4 or 5, is capable of receiving any of the plurality of L PN-modulated carriers at the single system carrier frequency $f_c$. Each receiver is also capable of performing PN code acquisition and tracking to determine the difference in time of arrival between any four of the PN-modulated signals.

As illustrated with respect to FIGS. 4 and 5, each hand-held receiver is provided with a PN code epoch recovery processor 12 for receiving the PN-modulated carriers of the transmitters. A time difference measurement processor 14 is used to determine the time difference between the local code timing epoch and the received, tracked code epoch of the transmitted signals. Based upon this information, a distance and direction determination processor 16 is used to determine the distance between the golfer and a particular target. In the embodiment provided in FIG. 4, a programmable memory 18 is provided to store the coordinates of the reference transmitters and the pin positions and other reference points on the golf course. This information is used along with information compiled in the time difference measurement processor 14 to determine the distance and direction results which are displayed. In the embodiment illustrated in FIG. 5, the pin position and other reference points are not stored in the hand-held receiver, but are transmitted by the various reference transmitters. A demodulator and data recovery device 20 is provided to receive this information, which is in turn forwarded to the distance and directional determination processor 16. In this instance, after the hand-held receiver synchronizes to the PN code from a specific transmitter, the received ranging signal is multiplied by the local PN code replica of that particular transmitter to remove the effect of the PN ranging code modulation. The resultant signal is then demodulated to recover the coordinate data transmitted from each transmitter which is stored in a random access memory provided in the receiver. Generally, the master transmitter would transmit a complete set of course coordinate and PN code data for the other transmitters, which is received by each of the receivers. However, it is noted that any of the transmitters could transmit this data.

More specifically, each receiver downconverts the incoming RF signal to a suitable IF for code cross-correlation by multiplication with the local PN code replica and integration over the full or partial code period. During each code period, the cross-correlation signal is sampled once at the hypothesized cross-correlation peak time, and compared to an acquisition threshold which determines code acquisition. If the threshold is not exceeded, the local PN clock is advanced or retarded in time by a prescribed fraction of a code chip interval, and again checked against a threshold. This search continues until the threshold is exceeded, at which time a tracking and verification mode is entered. During tracking, the cross-correlation peak is centered within a time interval equal to the PN code chip time $T_c = 1/R_c$ by the tracking loop, maintaining the difference between the local clock timing and the received code timing to a small fraction of the PN codes chip time. When it is determined that a correct acquisition has occurred and tracking has stabilized to the desired timing uncertainty (e.g. the code tracking loop is closed), the time difference between the local code timing epoch and the received, tracked code epoch is sampled.

For each separate distance and direction reading to a desired hole, the code acquisition, tracking, and time difference sampling is performed for four different transmitter signals. The set of four transmitter signals to be acquired and tracked are identified simply by their unique PN codes. For maximal-length PN codes which are also known as m-sequences, each code is described by the connections of the shift-register generator normally used to generate the transmitted sequence and local code reference. Choosing the transmitter signal to be acquired and tracked is accomplished by choosing the proper set of shift register connections to generate the local PN code reference. These are stored in the hand-held receiver memory for each of the reference transmitters.

In the preferred approach, the three-dimensional location coordinates of the reference transmitters and the coordinates of the holes and other locations of interest on the golf course can be pre-stored in the memory of the receiver unit or transmitted as data modulated onto the ranging signals. In one embodiment of this preferred approach, the memory is updated for a new golf course and/or when there are (significant) changes in the hole or transmitter locations. This can be accomplished by downloading new data into the (programmable) memory or by replacing the memory chip in the receiver with an updated memory chip within which the updated data is stored. In an alternate embodiment, the coordinate data is modulated onto the carrier prior to spectrum-spreading of the transmitter carrier. Please note that the implementation of the receiver function is not restricted to these embodiments, but may be implemented in a number of ways which are well-known to those knowledgeable in the spread-spectrum art.

Figure 2:
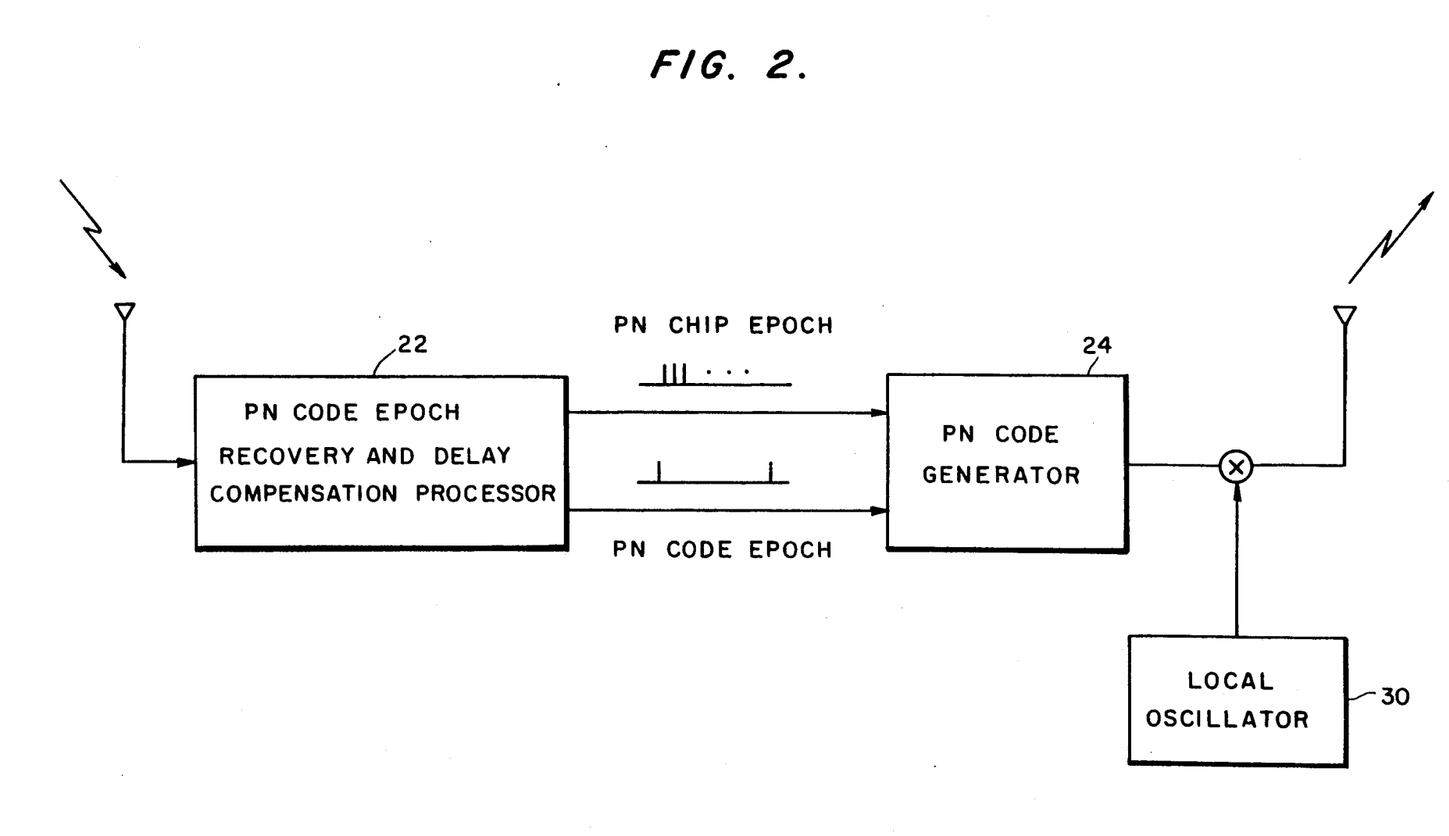
FIGS. 2 and 3 are block diagrams showing the major reference transmitter elements for two embodiments of the system.
Figure 3:
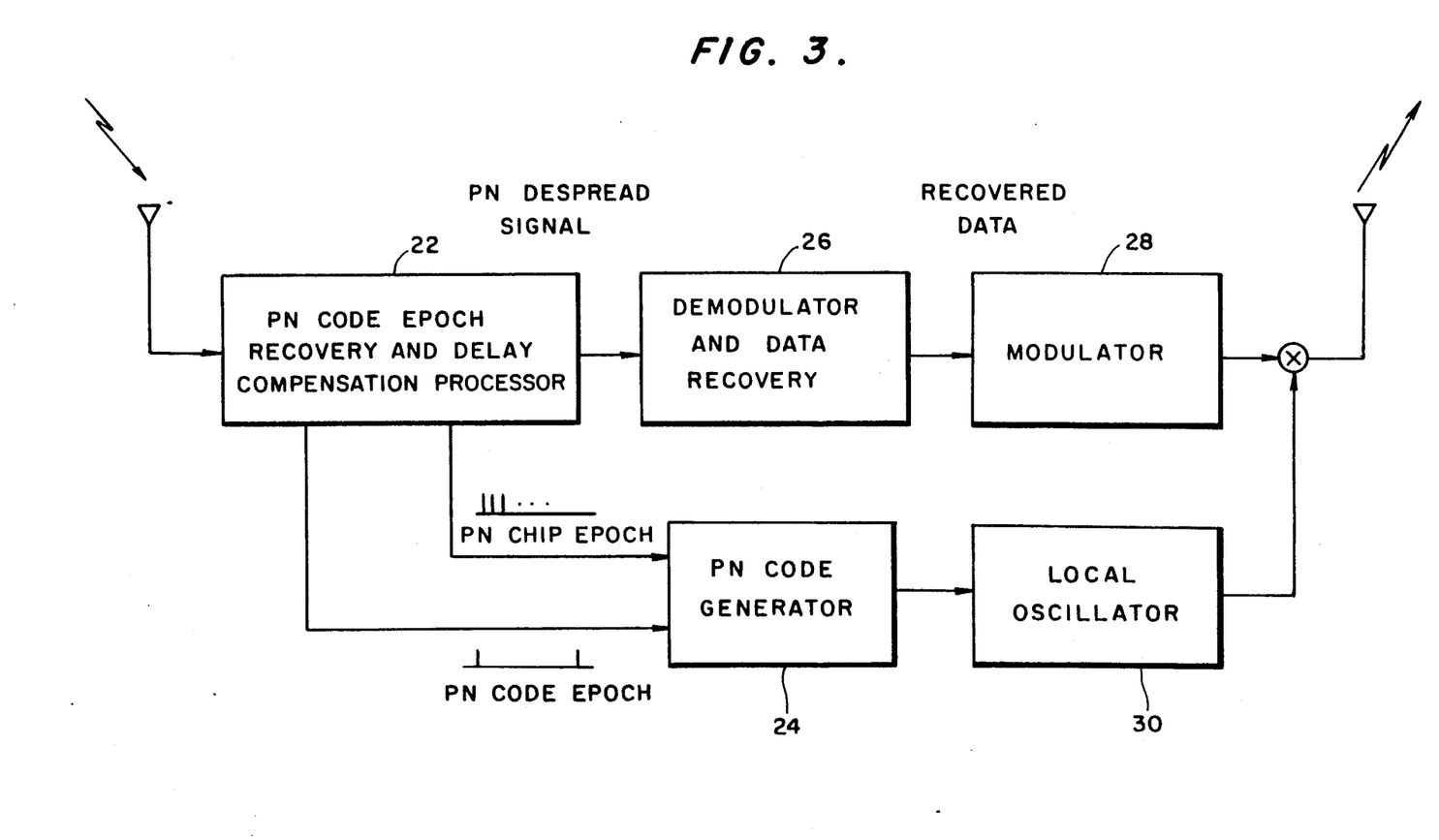

FIGS. 2 and 3 show two embodiments of the transmitters used in the system of the present invention. Once each transmitter is synchronized, each individual PN chip epoch and PN code epoch is modulated onto a particular carrier frequency utilizing PN code generator 24 and local oscillator 30 and then transmitted to the hand-held units. In the embodiment disclosed with respect to FIG. 3, a data transmitter !1 transmits information to each of the reference transmitters including each transmitter's three-dimensional reference coordinates as well as the coordinates of various geographical features, including each of the golf holes. This information is demodulated and recovered by unit 26, modulated at 28 and combined with the PN code and then transmitted.

Distance to a particular hole is obtained by using hyperbolic location techniques, based on the known coordinates of the four selected transmitters, the known coordinates of the hole, the known coordinates of a fixed reference point 9 for each hole, and the arrival time measurements $[t_i]$, $i=1,...,4$ obtained by the receiver for by tracking the four selected transmitter signals. It is noted that the reference point does not correspond to any particular location. It is simply a coordinate used to initialize the range estimation algorithm for each range estimate for a particular hole. In a preferred embodiment of the invention, a simplified algorithm which can easily be implemented with present technology in a portable, lightweight, hand-held receiver is employed. This algorithm is based on the use of Hotelling's algorithm for matrix inversion.

The distance estimation algorithm is derived as follows: We define $u=(u_x, u_y, y_z)^t$ as the actual but unknown coordinate set of the receiver, $u_o=(u_{ox}, u_{oy}, u_{oz})^t$ as coordinate set of a pre-computed reference point associated with each hole on the course, and $s_i=(x_i, y_i, z_i)^t$ as the known coordinate set of the i-th transmitter, $i=1,...,4$. It should be pointed out that a unique $u_o$ is assigned to each hole in the preferred approach of the present invention, but this does not have to be the case, and as little as one reference point for the whole golf course can be used. Therefore, it should also be pointed out that the set of reference transmitters and corresponding coordinates $[s_i]i=1,...,4$ can differ for each hole.

A column vector $D_k=(D_{k1}, D_{k2}, D_{k3}, D_{k4})^t$ is defined as the set of euclidean distances between the estimated receiver coordinates $(\hat{u})_k$ and the four reference transmitters, where $$D_{ki} = \|s_i - \hat{u}_k\| \qquad (2)$$
$$= \sqrt{(x_i - u_{kx})^2 + (y_i - u_{ky})^2 + (z_i - u_{kz})^2}$$

The column vector $D=(D_1, D_2, D_3, D_4)^t$ is defined as the set of euclidean distances $D_i = \|s_i - u\|$ between each reference transmitter and the actual transmitter location u.

For each distance estimate, the set $t=(t_1, t_2, t_3, t_4)^t$ of arrival time measurements obtained by a receiver is related to D by $$\begin{bmatrix} t_1 \\ t_4 \end{bmatrix} = \begin{bmatrix} t_0 \\ t_0 \end{bmatrix} + \begin{bmatrix} D_1/c \\ D_4/c \end{bmatrix} + \begin{bmatrix} \delta_1 \\ \delta_4 \end{bmatrix} \qquad (3)$$
$$= t_0 \mathbf{1} + D/c + \delta$$

The parameter $t_o$ represents the difference between the time reference of the transmitters and that of the receiver, which is added to all of the time of arrival measurements $t_i$. This parameter could be estimated but is not of interest and is eliminated in the hyperbolic range algorithm that is employed. The parameter $\delta_i$ represents the measurement error in the $t_i$ due to factors such as propagation anomalies, receiver noise, and errors in the $s_i$ of the transmitter references.

The undesired parameter $t_o$ is eliminated by obtaining the relative time differences $t_i - t_{i+1}$, $$t_i - t_{i+1} = \frac{D_i - D_{i+1}}{c} + \underbrace{\delta_i - \delta_{i+1}}_{=v_i} \qquad (4)$$

for $1=1, 2, 3$.

Equation 3 is now transformed to (using vector notation)

$$Ht = HD/c + c \qquad (5)$$

where $v=(v_1, v_2, v_3, v_4)^t$ and the $3 \times 4$ matrix H is equal to $$H = \begin{bmatrix} 1 & -1 & 0 & 0 \\ 0 & 1 & -1 & 0 \\ 0 & 0 & 1 & -1 \end{bmatrix} \quad (6)$$

and $$v = H\delta. \quad (7)$$

Equation 5 is transformed to its pseudo-range difference form by multiplying by the scalar propagation velocity c:

$$\underbrace{cHt}_{r} = \underbrace{HD}_{f(u)} + cv. \quad (8)$$

The vector r is the set of difference pseudo-ranges obtained from the measured $t_i$ and f(u) is a nonlinear vector function of the receiver location u.

A simple approach to developing an estimator $(\hat{u})_k$ of u is to linearize f(u) about the estimate $(\hat{u})_k$, and using Hotelling's algorithm, iteratively update the estimate until the difference between u and $(\hat{u})_k$ meets the desired accuracy. We can then describe f(u) approximately as $$f(u) \approx f((\hat{u})_k) + G_k(u - (\hat{u})_k) \quad (9)$$

In the above $G_k$ is the 3×3 matrix defined by $$G_k = \begin{bmatrix} \frac{\partial f_1}{\partial u_s}\bigg|_{u=\hat{u}_k} & \cdots & \frac{\partial f_1}{\partial u_z}\bigg|_{u=\hat{u}_k} \\ \vdots & & \vdots \\ \frac{\partial f_3}{\partial u_s}\bigg|_{u=\hat{u}_k} & \cdots & \frac{\partial f_3}{\partial u_z}\bigg|_{u=\hat{u}_k} \end{bmatrix} \quad (10)$$

where in the above $f_i(u) = D_{i+i}(u)$. Computation of G yields $$G_k = HF_k \quad (11)$$

where H is defined above and $F_k$ can be shown to be a 4×3 matrix given by $$F_k = \begin{bmatrix} \frac{u_{kx} - x_1}{D_{k1}} & \frac{u_{ky} - y_1}{D_{k1}} & \frac{u_{kx} - x_1}{D_{k1}} \\ \vdots & \vdots & \vdots \\ \frac{u_{kx} - x_4}{D_{k4}} & \frac{u_{ky} - y_4}{D_{k4}} & \frac{u_{kx} - x_4}{D_{k4}} \end{bmatrix} = \quad (12)$$

$$\begin{bmatrix} \frac{(\hat{u}_k - s_1)^t}{D_{k1}} \\ \vdots \\ \frac{(\hat{u}_k - s_4)^t}{D_{k4}} \end{bmatrix}$$

The matrix of the covariance of the arrival time errors is defined as $N_\delta$ and is given by $$N_\delta = \begin{bmatrix} E[\delta_1^2] & \cdots & E[\delta_1\delta_4] \\ \vdots & & \vdots \\ E[\delta_4\delta_1] & \cdots & E[\delta_4^2] \end{bmatrix} \quad (13)$$

The covariance matrix of the measurement errors is then defined by $$Nv = HN_{67} H^t \quad (14)$$

A reasonable assumption is that the v, the measurement error vector, is Gaussian. Under this assumption, the maximum likelihood estimator $(\hat{u})$ of the receiver's actual position u is one which minimizes the quadratic form $$Q(u) = \{r - f(u)\}^t N_v \{r - f(u)\} \quad (15)$$

The approximation Equation (9) for f(u) leads to the following recursive estimator:

$$\hat{u}_k = \hat{u}_{k-1} + \underbrace{(G_k^t N_v G_k)^{-1} G_k^t N_v^{-1}}_{Q_k}\{r - f(u_k)\} \quad (16)$$

$$\underbrace{\hat{u}_{k+1} - \hat{u}_k}_{(\Delta q)_k} = Q_k \underbrace{[r - r_k]}_{(\Delta u)_k}$$

$$(\Delta u)_k = P_k(\Delta q)_k$$

where $P_k = Q_k$ and which starts with the initial estimate $(\hat{u})_o = u_o$. The iterative process continues with each distance estimate until $\| q \|_k \leq \epsilon$ for some k=K where $\epsilon$ is a pre-chosen convergence number for each hole.

When convergence has occurred, the distance to the hole is simply computed as $$D_{hole} = \|\hat{u}_k - h\| \quad (17)$$
$$= \sqrt{(\hat{u}_{xK} - x_h)^2 + (\hat{u}_{yK} - y_h)^2 + (\hat{u}_{zK} - z_h)^2}$$

where $h = (x_h, y_h, z_h)^t$ is the coordinate vector of the hole.

The direction to the hole can also be computed by specifying a unit vector $r = (r_x, r_y, r_z)$ pointing to a reference direction, nominally magnetic north. The angle 8 between the direction to the pin and the reference direction can be determined as $$\theta = \angle(r_x, r_y) - \angle(u_x, u_y) \qquad (18)$$

where $\angle(r_x, r_y)$ is the angle of $(r_x, r_y)$ relative x-axis on the horizontal plane (e.g. no height or z coordinate is required), and $\angle(u_x, u_y)$ is the angle of $(u_x, u_y)$ relative to the reference x-axis on the horizontal plane.

The direction to the hole can be shown on the display device as an angle relative to an arrow which is aligned to the reference direction (magnetic north) using the compass device which is part of the display panel of the hand-held receiver.

In summary, to determine the distance and direction information requested, the following information must be present in the programmable memory of the hand-held receiver, or transmitted to this receiver by the transmitters.

(a) The receiver control information (addresses) required to select the four local PN sequences corresponding to those of the four reference transmitters assigned to the hole.

(b) The three-element coordinate vectors $\{s_i\}i=1,...,4$ for the four reference transmitters to be used with the particular hole.

(c) The three-element coordinate vector h of the hole.

(d) The predetermined three-element coordinate vector for the hole reference point $u_o$.

(e) The nine initial elements $Q_o$ of the $3 \times 3$ matrix $Q_k$, which is pre-computed for each hole using (16).

(f) The 12 elements of the $3 \times 4$ matrix H.

(g) The 16 elements of the $4 \times 4$ matrix $N_v$.

(h) The 12 elements of the $4 \times 3$ matrix D, evaluated at $u = u_o$.

(i) The convergence parameter $\epsilon$.

For each distance request, the hand-held unit is activated, and a particular distance is requested using the keyboard entries of 32 or 34. The following steps are automatically performed.

Step 1
Acquire, track, and measure the time-of-arrival (relative to the local receiver clock) of the four transmitter signals from the transmitters assigned to the hole.

Step 2
Set $k = 0$. This is accomplished by setting a software loop parameter or hardware counter in the receiver processor.

Step 3
Set $(u)_k = u_o$

Step 4
Compute the three-element relative pseudo-range vector r from the four-element time-of-arrival measurement vector t via $r = cHt$ Step 5
Set $k = k+1$ (increment the iteration counter)

Step 6
Compute $r_k = HD_{k-1}$

Step 7
Compute $(\Delta u)_k = r - r_k$

Step 8
Compute the matrix $P_k$. Replace the elements of $P_{k-1}$ with the elements of $P_k$ Step 9
Compute the matrix $Q_k$ using Hotelling's algorithm with one iteration:
$$Q_k = Q_{k-1}(2I - P_k Q_{k-1}) \qquad (19)$$

Replace the elements of $Q_{k-1}$ with those of $Q_k$

Step 10
Compute $\|\Delta q\|_k = Q_k \|\Delta u\|_k$

Step 11
Compute the k-the iteration of position estimate, e.g. replace $(u)_{k-1}$ with $(u)_k = (\Delta q)_k + (u)_{k-1}$ Step 12
Compute the new $D_k$ and replace the elements of $D_{k-1}$ Step 13
Test $\|\Delta q\|_k$ against $\epsilon$. If $\|\Delta q\|_k < \epsilon$ repeat steps 4 through 9, otherwise proceed to step 14

Step 14
Compute $d_{hole}$ using equation (17) and $\theta$ and convert to unit measure such as yards and degrees, respectively.

Step 15
Update displayed distance to hole on the receiver control panel.

Step 16
Update displayed direction by first aligning a reference arrow (on hand-held unit) to magnetic north and displaying the computed angle in degrees.

Having described several embodiments of the present invention, it is believed that other modifications, variations and charges will be suggested to those skilled in the art in view of the description set forth above. It is therefore to be understood that all such variations, modifications and charges are believed to fall within the scope of the invention as defined in the appended claims.

What is claimed is:

1. A system for determining the distance from a first point on a golf course to a second point on the golf course, comprising:

a plurality of transmitters provided within or proximate to the boundaries of the golf course, each of said transmitters provided with a means for transmitting the same RF signal as all of the transmitters, said RF signal modulated by a spread-spectrum pseudo-noise (PN) coded sequence unique to each of said transmitters;

at least one portable receiver unit capable of receiving the signals transmitted by said transmitters, said receiver provided with the PN codes for each of said transmitters and including a means for acquiring the reference coordinate with respect to a reference point for each of said transmitters as well as the coordinates of various features on the golf course, including the position of each of the holes on the golf course, said receiver also provided with a processor for determining the position of said receiver based upon time differences of the epochs of each of said transmitter's PN code and the PN code for each of said transmitters provided in said receiver, said receiver provided with a means for determining the distance between said receiver and a specified second point based upon the determined position of said receiver and a second point, said receiver provided with an input means for inputting the second specified point and a display means for displaying the distance and direction to the second specified point.

2. The system in accordance with claim 1, each of said receivers is provided with a digital memory and said reference coordinates of each of said transmitters is provided within said digital memory.

3. The system in accordance with claim 2 wherein said transmitters are greater than four and the distance from the first point to the second point is determined by only four of said transmitters, said receiver provided with a means for determining which four transmitters to utilize for distance determination.

4. The system in accordance with claim 1, wherein each of said transmitters is provided with a means for transmitting its own reference coordinates to each of said receivers simultaneously with the transmission of each of said transmitter's unique PN sequence code.

5. The system in accordance with claim 1 wherein said transmitters are greater than four and the distance from the first point to the second point is determined by only four of said transmitters, said receiver provided with a means for determining which four transmitters to utilize for distance determination.

6. The system in accordance with claim 1 further including a synchronizing means in each of said transmitters and each of said receiver for time synchronizing the PN code sequences.

7. The system in accordance with claim 1, wherein the direction from the first point to the second point is displayed on said display means.

8. A method of determining the distance and direction from one point on a golf course to a second point on a golf course, comprising the steps of:
   installing a plurality of transmitters in the vicinity of the golf course;
   determining the coordinate of each of said transmitter with respect to a reference point;
   providing a unique spread-spectrum pseudo-noise (PN) code sequence for each of said transmitters;
   equipping at least one portable receiver with the PN code sequences of each of said transmitters;
   providing each of said receivers with the coordinates of each of said transmitters and the coordinates of various geographic points on a golf course, including the golf holes;
   initiating a distance request on said receiver;
   transmitting the unique PN code sequence of each of said transmitters to each of the receivers;
   determining the position of each of said receivers utilizing an algorithm provided in each of said receiver based upon the time differentials of the epochs of each of said transmitter's PN code and the PN code for each of said transmitter's PN code and the PN code for each of said transmitter provided within each of said receivers;
   computing the distance from one point on the golf course to the second point on the golf course; and
   displaying the computed distance on said receiver.

9. The method in accordance with claim 8, wherein the coordinates of each of said transmitter and the coordinates of the various geographic points on the golf course are transmitted to said receiver by said transmitters along with the transmitter's unique PN code sequence.

10. The method in accordance with claim 8, including the step of time synchronizing all of said transmitters and said receivers prior to said transmitting step.

11. The method in accordance with claim 8, including the steps of computing the direction from the first point to the second point and displaying said direction on said receiver.

* * * * *